(12) United States Patent
Nakayama et al.

(10) Patent No.: US 6,574,295 B2
(45) Date of Patent: Jun. 3, 2003

(54) BOILING WATER TYPE NUCLEAR REACTOR USE CONTROL ROD

(75) Inventors: Michio Nakayama, Nishinarusawa (JP); Norio Kawashima, Mito (JP); Shinobu Okido, Hitachi (JP)

(73) Assignees: Hitachi, Ltd., Tokyo (JP); Hitachi Engineering Co., Ltd., Hitachi (JP)

( * ) Notice: Subject to any disclaimer, the term of this patent is extended or adjusted under 35 U.S.C. 154(b) by 7 days.

(21) Appl. No.: 09/953,370

(22) Filed: Sep. 17, 2001

(65) Prior Publication Data
US 2002/0118788 A1 Aug. 29, 2002

(30) Foreign Application Priority Data
Feb. 23, 2001 (JP) ........................................ 2001-047517

(51) Int. Cl.[7] .................................................. G21C 7/10
(52) U.S. Cl. ........................ 376/327; 376/223; 376/224; 376/227; 376/236; 376/237; 376/242; 376/335; 376/415; 376/432
(58) Field of Search ................................ 376/223, 224, 376/227, 236, 237, 242, 327, 335, 415, 432

(56) References Cited

U.S. PATENT DOCUMENTS

| | | | |
|---|---|---|---|
| 4,400,346 A | * | 8/1983 | Aisaka et al. |
| 4,462,957 A | * | 7/1984 | Fukie et al. |
| 4,874,574 A | * | 10/1989 | Igarashi et al. |
| 4,876,060 A | * | 10/1989 | Yoshioka et al. ............ 376/327 |
| 5,243,631 A | * | 9/1993 | Cearley et al. ........... 29/402.08 |
| 5,247,549 A | * | 9/1993 | Cearley et al. .............. 376/327 |
| 6,137,854 A | * | 10/2000 | Ueda et al. .................. 376/327 |
| 6,285,728 B1 | * | 9/2001 | Ueda et al. .................. 376/219 |
| 6,333,955 B1 | * | 12/2001 | Kawashima et al. ........ 376/228 |

FOREIGN PATENT DOCUMENTS

| | | | |
|---|---|---|---|
| JP | 6-1128187 A | * | 6/1986 |
| JP | 2-140692 | * | 5/1990 |
| JP | 09222495 | | 8/1997 |

* cited by examiner

Primary Examiner—Charles T. Jordan
Assistant Examiner—John Richardson
(74) Attorney, Agent, or Firm—Crowell & Moring LLP

(57) ABSTRACT

In order to provide a boiling water type nuclear reactor use control rod with a guide use roller which improves corrosive environment at a clearance in the guide use roller and suppresses a generation of stress corrosion cracking while maintaining sliding function of the control rod by the guide use roller, at least one of a handle 5, a lower portion supporting plate 2a and a dropping speed limiter 2 is provided with the guide use roller, and a space which causes water flow in a clearance between a pin 9 and a pin hole 12 in the guide use roller is provided adjacent the clearance.

8 Claims, 11 Drawing Sheets

BOILING WATER TYPE NUCLEAR REACTOR USE CONTROL ROD

BACKGROUND OF THE INVENTION

1. Field of the Invention

The present invention relates to a boiling water type nuclear reactor use control rod which is for controlling an output of a nuclear reactor in a boiling water type nuclear reactor.

2. Convenitonal Art

Since reactor water in a boiling water type nuclear reactor contains such as oxygen and hydrogen peroxide which are produced through decomposition of water due to radiation exposure, it is commonly known that the reactor water is a negative potential as a corrosive environment against structural bodies in the reactor. One of conventional art for improving such corrosive environment is disclosed in JP-A-9-222495 (1997) in which hydrogen is injected into reactor water.

The method of injecting hydrogen is very effective for portions in a nuclear reactor in which water easily circulates, however, the effect of the method is thought to be a little for portions where water hardly circulates. For example, a clearance between a pin and a pin hole in a guide use roller for sliding a control rod in its axial direction is one of the portions where the water hardly circulates. If the current operation interval of the nuclear reactor is unchanged, a possible corrosion at such clearance causes no problem, however, the output of the nuclear reactor is increased and a stay interval of the control rod in the nuclear reactor is further prolonged, a possible corrosion at the clearance may cause a problem.

As one of methods of improving the environment at such clearance, it is conceived to exchange water at the clearance portion by simply enlarging the clearance. However, if the clearance between a pin and a pin hole is simply enlarged, the pin can not be set at a correct position, therefore, the sliding function of the control rod by the guide use roller can be extremely reduced.

SUMMARY OF THE INVENTION

An object of the present invention is to provide a boiling water type nuclear reactor control rod which can surely improve corrosive environment in a clearance portion at a guide use roller while maintaining a sliding function of the control rod by the guide use roller even when the stay interval of the control rod in the nuclear reactor is further prolonged.

In order to achieve the above object, in a boiling water type nuclear reactor use control rod according to the present invention which comprises a tie rod having substantially cross shaped cross section, a plurality of sheathes having substantially U shape cross section and attached to the respective sides of the tie rod, a plurality of neutron absorption rods disposed inside the respective sheathes, a handle which is disposed at one ends of the sheathes in the axial direction of the control rod and a lower portion supporting plate or a dropping speed limiter which is disposed at the other ends of the sheathes in the axial direction of the control rod, at least one of the handle, the lower portion supporting plate and the dropping speed limiter is provided with a sliding structure body (a guide use roller) which is constituted by a pin, a pin hole into which the pin is inserted and a roller which rotates around the pin in the axial direction, and a space (a groove) which causes water flow in a clearance between the pin and the pin hole is provided adjacent the clearance.

Preferably, the above space is provided at two positions one at the upstream side and the other at the downstream side in the axial direction. Further, preferably, the space is formed so as to extend near to the end portion of the pin.

According to the present invention, through the action of the space for causing water flow in the clearance, the water in the clearance portion can be effectively exchanged. Thereby, a possible increase of such as oxygen and hydrogen peroxide produced through water decomposition due to radiation exposure in the clearance can be prevented. Accordingly, even if a stay interval of the control rod in the nuclear reactor is prolonged, the corrosive environment at the clearance portion in the guide use roller can be surely improved.

Further, at a portion in the clearance where no space is formed, since the pin is positioned by the pin hole at a predetermined position, the sliding function of the control rod by the guide use roller can be maintained. Further, in case when cleaning is insufficient at the time of production of the control rod, through the water exchange in the clearance portion in the nuclear reactor a cleaning effect thereof can be expected.

DETAILED DESCRIPTION OF THE PREFERRED EMBODIMENTS

Figure 1:
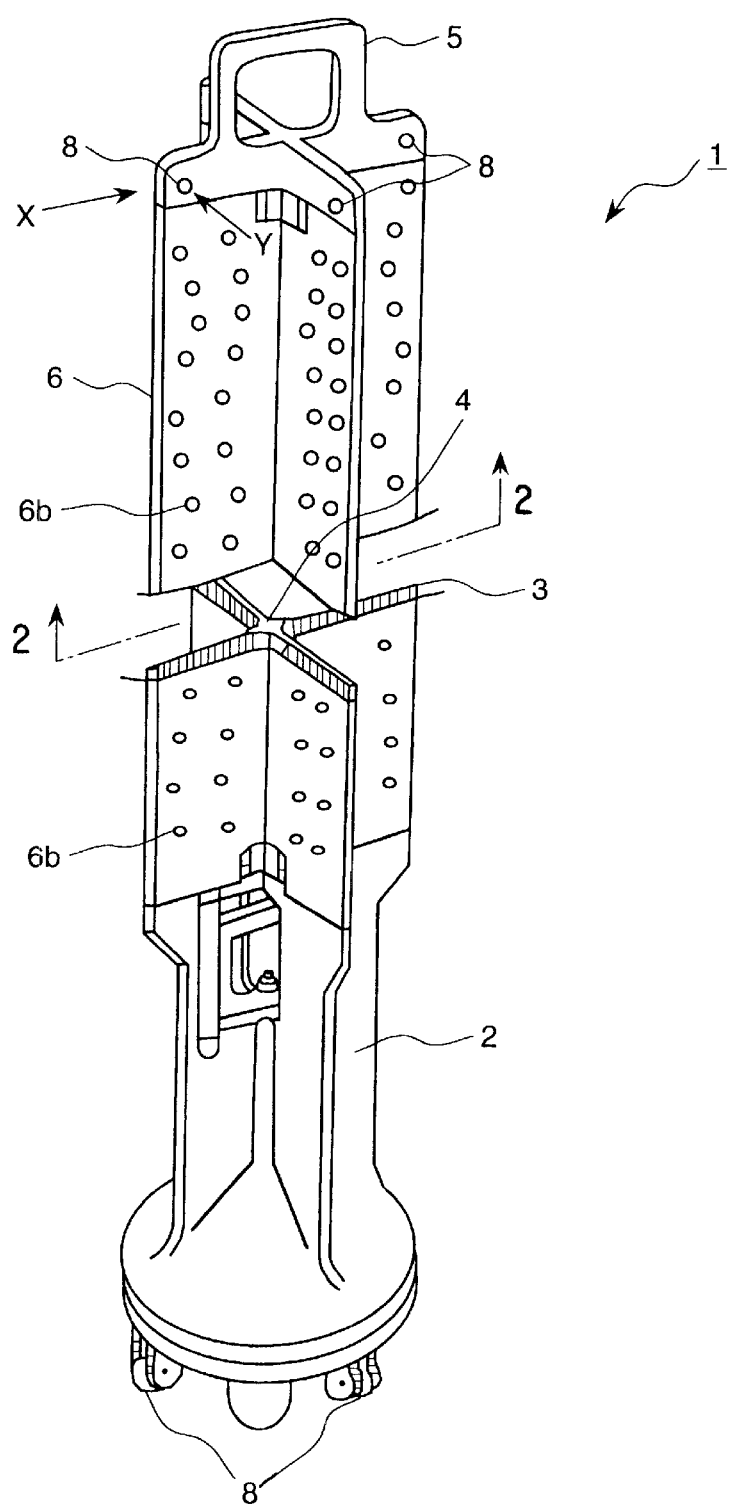
FIG. 1 is a schematic structural diagram of one embodiment of a boiling water type nuclear reactor use control rod according to the present invention.
Figure 2:
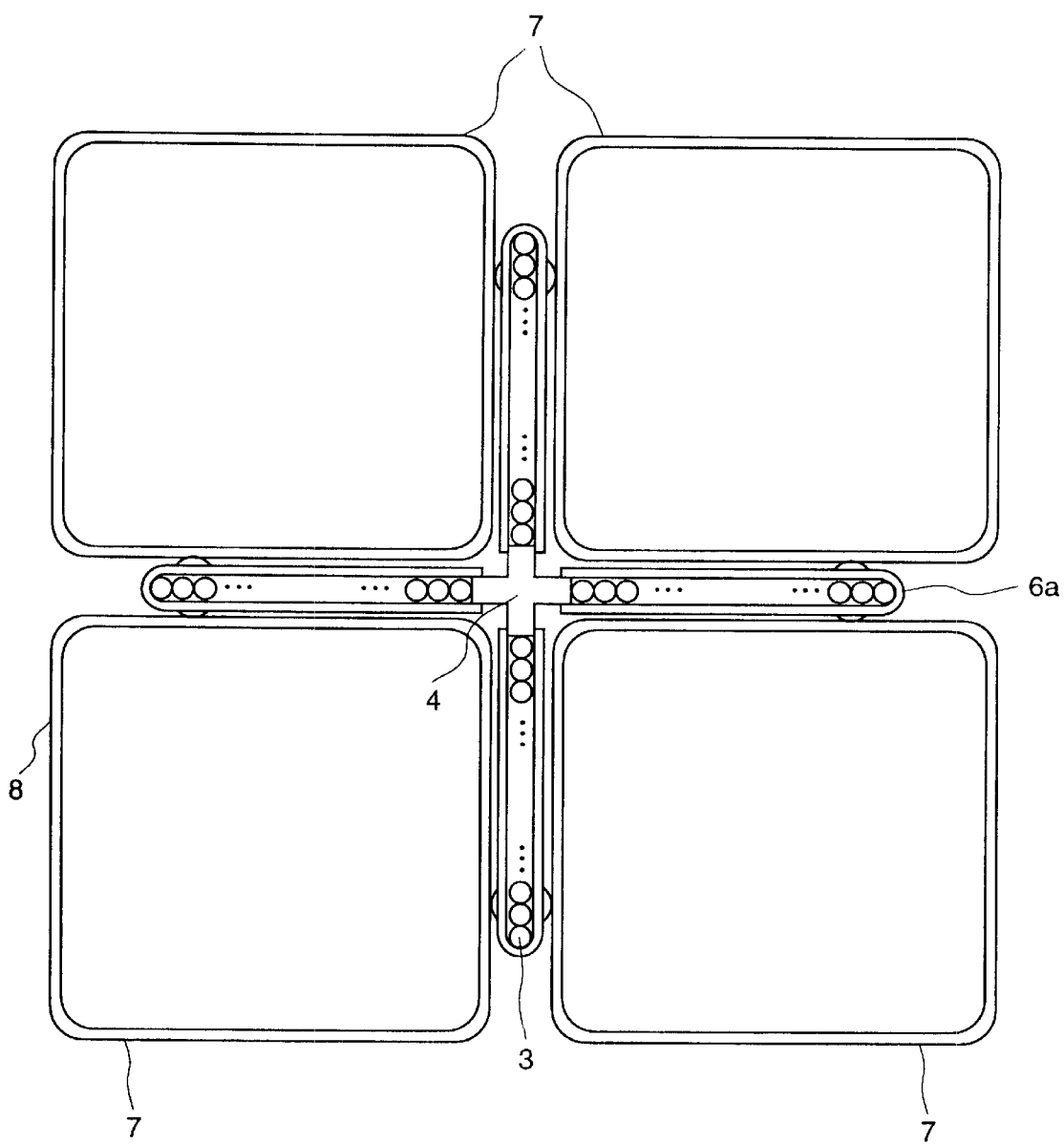
FIG. 2 is a view seen along an arrowed line a—a in FIG. 1.

Hereinbelow, an embodiment of a boiling water type nuclear reactor use control rod according to the present invention will be explained with reference to the drawings. The present control rod is what is inserted into a reactor core in a boiling water type nuclear reactor and controls an output of the nuclear reactor. FIG. 1 is a schematic structural diagram of the present control rod of which center portion in its axial direction is omitted. FIG. 2 is a view taken along an arrowed line a—a in FIG. 1, which shows a condition in which the present control rod inserted between fuel channel boxes.

As shown in FIG. 1, a control rod 1 is configured in a substantially cross shape in its cross section (cross section perpendicular to the axial direction) and includes four blades 6 extending in four directions from the axial center (center axis). A handle 5 made of stainless steel is disposed at the upper ends of the blades 6 and a dropping speed limiter 2 is disposed at the lower ends of the blades 6.

Each of the blades 6 is constituted by a substantially U shaped sheath 6a of which both ends are attached to a tie rod 4 made of stainless steel disposed at the axial center of the control rod 1 and neutron absorption rods (neutron absorbers) 3 arranged inside the sheath 6a. Each of the blades 6 is provided with many number of openings 6b on the side face thereof, and through these openings 6b it is designed that cooling water flows within the blades 6. The tie rod 4 is also configured to have a substantially cross shape in its cross section.

A handle 5 is attached to the upper portion of the tie rod 4 by welding and a lower supporting plate 2 is also attached to the lower portion of the tie rod 4 by welding. The upper end portions of the sheathes 6a are fitted to the lower portion of the handle 5 and are attached thereto by welding. The lower end portions of the sheathes 6a are also fitted to the upper portion of the lower portion supporting plate 2 and are attached thereto by welding. The neutron absorption rods 3 are arranged in one line in a region between the handle 5 and the lower portion supporting plate 2 as well as in a region inside respective sheathes 6a and are held therein. As a material for the sheathes 6a such as stainless steel (SUS 304, SUS 316L) is used. The neutron absorption rods 3 are primarily for absorbing thermal neutrons in the reactor core and a material therefor such as B4C and Hf is used.

As shown in FIG. 2, the control rod 1 is inserted into fuel channel boxes 7 and the amount of insertion thereof is required to be adjusted depending on respective conditions of starting, operating and stopping of the nuclear reactor. Namely, the control rod 1 is required to be moved in its axial direction. In order to assist the movement of the control rod 1 in its axial direction, each of four wing portions constituting the handle 5 is provided with a guide use roller (a sliding structural body) and the dropping speed limiter 2 is also provided with the guide use rollers at four positions around the circumference thereof. Rollers 8 as shown in FIG. 2 are a part of the constitutional elements of the guide use roller.

FIG. 2 shows a state where the rollers 8 at the handle 5 contact on the outer surfaces of square cylindrical fuel channel boxes 7. Through the provision of such rollers 8, the control rod 1 can be easily moved without damaging the control rod 1 and the fuel channel boxes 7. For the sake of simplicity, fuel rods in the fuel channel boxes 7 and a part of the neutron absorption rods 3 in the sheathes 6a are omitted from FIG. 2.

Figure 3A:
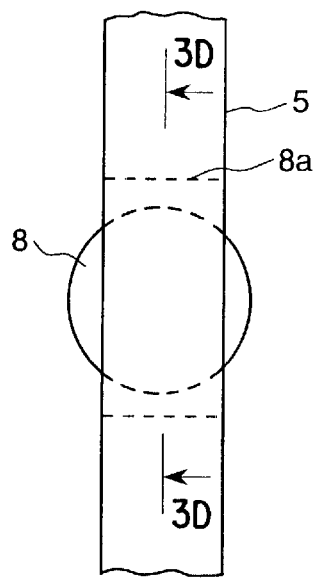
FIG. 3A is a view seen along an arrow X in FIG. 1 and is a detailed structure of and around a guide use roller for a handle in the first embodiment according to the present invention.

Now, a detailed structure of and near the guide use roller for the handle 5 in the first embodiment according to the present invention will be explained with reference to FIGS. 3A through 3D. FIG. 3A is a view seen along an arrow X in FIG. 1, FIG. 3B is a view seen along an arrow Y in FIG. 1, FIG. 3C is a cross sectional view taken along lines b—b in FIG. 3B and FIG. 3D is a cross sectional view taken along lines c—c in FIG. 3A.

Figure 3B:
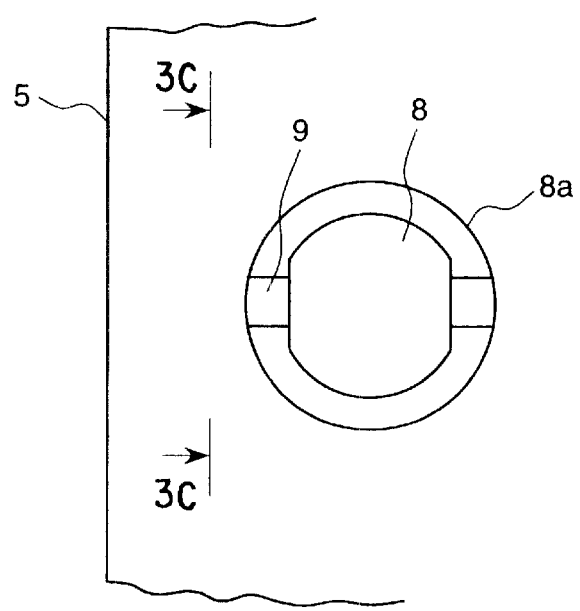
FIG. 3B is a view seen along an arrow Y in FIG. 1 and is a detailed structure of and around a guide use roller for a handle in the first embodiment according to the present invention.
Figure 3C:
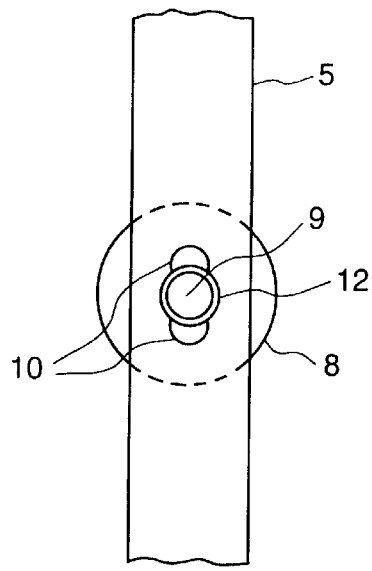
FIG. 3C is a cross sectional view taken along arrowed lines b—b in FIG. 3B.

As shown in FIG. 3B, a circular hole 8a is provided at the side face of the handle 5 and a roller 8 is disposed in the circular hole 8a so as to permit rotation around a pin 9. The pin 9 is disposed in a direction perpendicular to the axial direction of the control rod 1 so that the rotating direction (vertical direction in FIG. 3B) of the roller 8 coincides with the movement direction (axial direction) of the control rod 1.

Figure 3D:
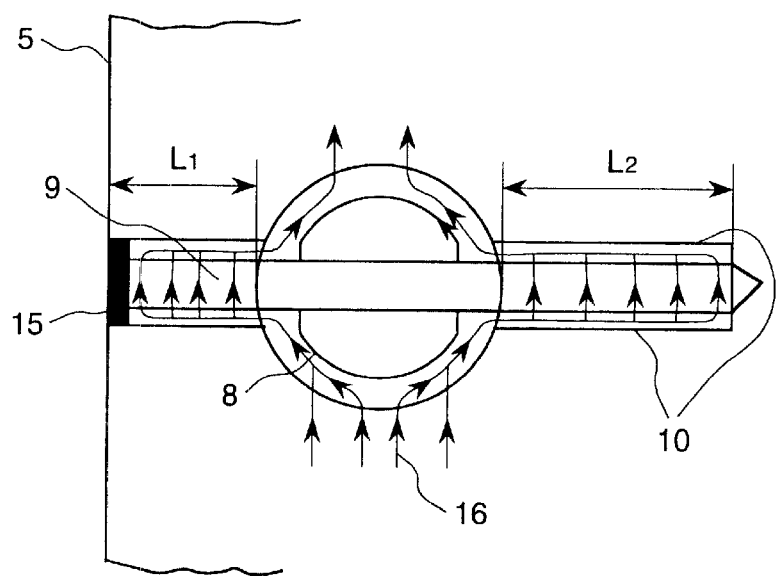
FIG. 3D is a cross sectional view taken along arrowed lines c—c in FIG. 3A.

As shown in FIG. 3D, the left end portion of the pin 9 is secured to the handle 5 by welding, numeral 15 in FIG. 3D shows the welding portion of the pin 9. As shown in FIG. 3C, at the upper portion and the lower portion of a pin hole 12 where the pin 9 is inserted grooves 10 are provided. Namely, the two grooves 10 are disposed at the upstream side and the downstream side in the axial direction of the control rod 1 as well as adjacent to a clearance between the pin 9 and the pin hole 12. In other words, two grooves 10 are communicated to the clearance at the upstream side and the downstream side of the clearance. As shown in FIG. 3D the grooves 10 are formed from the circular hole 8a near to the end of the pin 9. The guide use roller (sliding structural body) is constituted by the pin 9, the pin hole 12 and the roller 8.

As methods of forming the grooves 10 at the handle 5, such as electric discharge machining, drilling and end milling can be used. When performing electric discharge machining, a finishing is required to suppress generation of microcracks. When performing drilling, if size of the grooves 10 is small, the processing of the pin hole can be performed after processing the pin, however, if the size of the groove is large and the groove is processed first, it becomes difficult to ensure a positional accuracy of the pin hole. Further, if the pin hole is processed first, it becomes difficult to ensure a size accuracy of the groove, because the drill escapes toward the pin hole. Accordingly, when the groove is large, it is preferable to process the pin hole first and then to process the groove little by little with an end mill.

When the control rod 1 is set in the nuclear reactor, the cooling water flows in the axial direction (in vertical direction in. FIGS. 3C and 3D) of the control rod 1. Accordingly, through the provision of the two grooves 10 as shown in FIGS. 3C and 3D, a water flow 16 as shown in FIG. 3D is positively induced. Namely, the grooves 10 include a function of causing water flow in the clearance between the pin 9 and the pin hole 12 (a function of promoting water flow in the clearance). In this instance, water entering into the clearance from the lower portion of the space between the roller 8 and the circular hole 8a flows out via the grooves 10 to the upper portion of the space between the roller 8 and the circular hole 8a.

Through the provision of the grooves 10 which form cooling water passages as has been explained at the upper portion and the lower portion of the pin hole 12, water in the clearance between the pin 9 and the pin hole 12 can be effectively exchanged. Accordingly, even if the stay interval of the control rod 1 in the nuclear reactor is prolonged, the corrosive environment at the clearance portion around the pin 9 can be surely improved. Thereby, the soundness of the control rod is enhanced and reliability thereof can be enhanced. Further, with the portions in the clearance portion where no grooves 10 are provided, since the pin 9 is positioned by the pin holes 12 at a predetermined position, the sliding function of the control rod 1 by the guide use roller can be maintained.

Figure 4:
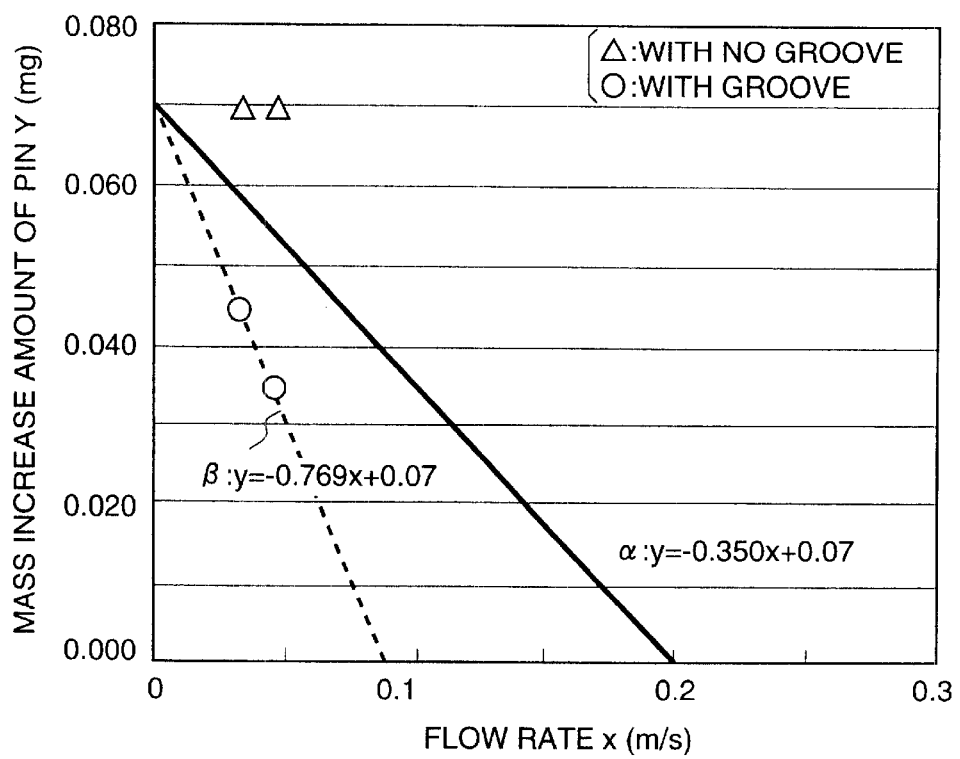
FIG. 4 is a diagram showing a measurement example determining a relationship between cooling water flow rate and mass increasing amount of a pin subjected to a corrosion test.

Now, a preferable size of the groove 10 will be explained. FIG. 4 shows an example of corrosion test results performed by varying cooling water flow rate under a condition where the pin 9 is disposed in the handle 5 of the control rod 1. The abscissa represents cooling water flow rate x around the control rod 1, and the ordinate represents mass increase amount y of the pin 9 in the corrosion test. A positive mass increase amount y implies that the mass of the pin 9 has increased due to corrosion product. Namely, mass increase amount y represents corrosion amount of the pin 9.

The test conditions are as follows; the diameter of the pin 9 is 3.18 mm, the diameter of the pin hole 12 is 3.2 mm, the depth of the pin hole 12 $L_2$=11 mm (see FIG. 3D), the temperature of the cooling water 288° C., the desolved oxygen concentration in the cooling water is 3.2 ppm. The cross sectional configuration of the grooves 10 provided at the upper portion and at the lower portion of the pin hole 12 is width of 2 mm×depth of 1 mm. $L_1$ in FIG. 3D is about 7.9 mm and for the cooling water temperature and the desolved oxygen concentration typical values in an actual nuclear reactor are used. Under the above conditions the corrosion test was performed for about 200 hours.

In FIG. 4, symbol Δ shows data in the case of no grooves and symbol ○ shows data in the case with grooves. In the case of no grooves, the clearance between the pin 9 and the pin hole 12 was 0.01 mm at one side thereof and the cross sectional area of the clearance was 0.1 mm², of which clearance cross sectional area is comparable with the actual nuclear reactor. In the case with grooves the total cross sectional area of the clearance and of the grooves was 4.3 mm².

As shown in FIG. 4, in the case of no grooves, even when the cooling water flow rate x are varied, the mass increase amount y varies little and stays at 0.07 mg. On the other hand, in the case with grooves the mass increase amount y decreases depending on the increase of the cooling water flow rate x. In this instance, the relationship between the flow rate x and the mass increase amount y can be approximated by β (y=−0.769x+0.07) as shown by a dotted line in FIG. 4. Namely, FIG. 4 shows that in the case of no grooves substantially no water flow exists in the clearance between the pin 9 and the pin holes 12, and in the case with grooves water flow exists in the clearance between the pin 9 and the pin hole 12.

In the actual nuclear reactor, there exists water flow (flow rate: about more than 0.2 m/s.) directing from the bottom to the top between the control rod 1 and the fuel channel boxes 7. In order to keep the mass increase amount at 0 mg under the flow rate of 0.2 m/s, it is necessary to determine the negative variation rate of the mass increase amount y with respect to flow rate x (hereinafter referred to as corrosion decrease rate) at the negative value larger than −0.35 mg/(m/s). Such border line α(Y=−0.350x+0.07) is shown by a solid line in FIG. 4.

Figure 5:
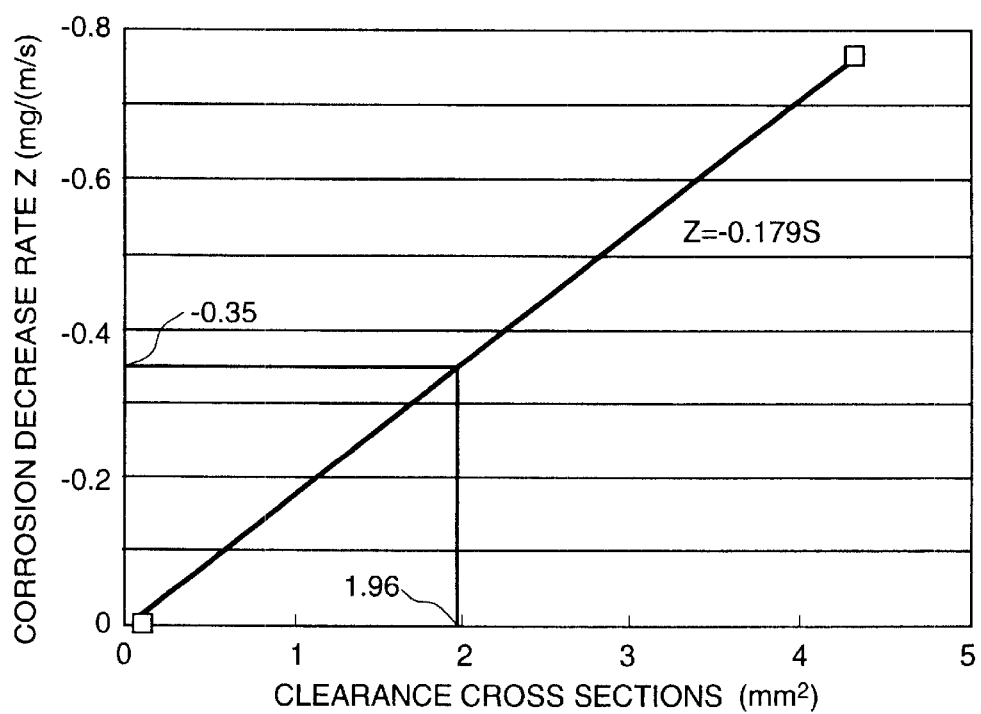
FIG. 5 is a diagram showing a measurement example determining a relationship between corrosion decreasing rate and clearance cross sectional area.

FIG. 5 is a determined result of a relationship between the above referred to corrosion decrease rate Z and clearance cross sectional area S. Herein, the clearance cross sectional area S represents a total sum of the cross sectional area of the clearance between the pin 9 and the pin hole 12 and the cross sectional area of the grooves 10. The relationship between corrosion decrease rate Z and clearance cross sectional area S can be approximated as Z=−0.179S. In order to obtain a corrosion decrease rate more than −0.35 mg/(m/s), it is understood from FIG. 5 that the clearance cross sectional area S has to be determined more than 1.96 mm². In view of the clearance between the pin 9 and the pin hole 12 in an actual nuclear reactor is 0.01 mm (the clearance cross sectional area of 0.1 mm²), it is preferable to determine the cross sectional area of the grooves 10 to be more than 1.86 mm².

Figure 6:
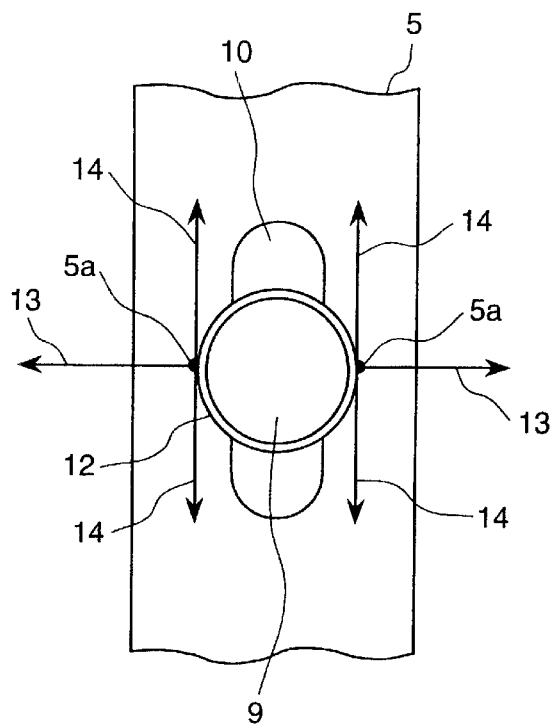
FIG. 6 is a view for explaining a stress acting on a handle in association with corrosion.

Now, another advantage achieved by the provision of the grooves 10 at the pin hole 12 will be explained. In case when reactor water can not circulate, because of, for example, failure of a pump which causes to circulate water (reactor water) in a nuclear reactor, a corrosion possibly advances rapidly even with the structure including the grooves 10. In such instance, a possible corrosive product grows in the clearance between the pin 9 and the pin hole 12 and a force 13 which expands the handle 5 will be caused as shown in FIG. 6. Herein, FIG. 6 shows the same cross section as in FIG. 3C but the roller 8 is omitted.

In this instance, a position in the handle 5 where a cracking is generated is at portions 5a of which plate thickness is most thin and if a stress 14 acting on the portions 5a exceeds the tensile stress of the constitutional material of the handle 5, it is believed that a cracking will be generated. However, through the provision of the grooves 10 at the pin hole 12 according to the present embodiment, the handle 5 can be easily deformable by the force 13 when subjected to the above referred to phenomenon. Therefore, the stress 14 acting on the portions 5a is reduced small in comparison with when no grooves 10 are provided. Namely, even if a corrosion is caused in the clearance between the pin 9 and the pin hole 12, the stress 14 acting on the portions 5a can be reduced, thereby, a possible generation of a stress corrosion cracking at the handle 5 can be suppressed.

The total cross sectional area of 4.3 mm² as explained in connection with FIG. 4 is a preferable value determined in view of a possible stress 14 generated by a corrosion caused by a pump failure circulating the reactor water as well as a possible loading applied at the time of earthquake. A preferable size of the grooves 10 corresponding to the above total cross sectional area is width of 2 mm×depth of 1 mm.

Herein, the above discussion result depends on the fact that the pin hole depth $L_2$ is 11 mm as in the actual nuclear reactor. If the pin hole depth $L_2$ is shallower, the total cross sectional area (namely, cross sectional area of the grooves 10) can be reduced small corresponding to the shallowing ratio.

Figure 7A:
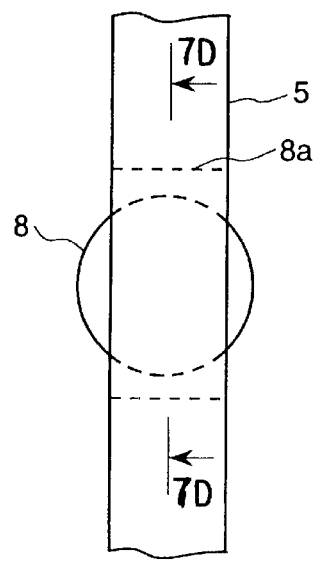
FIG. 7A is a view seen along an arrow X in FIG. 1 and is a detailed structure of and around a guide use roller for a handle in the second embodiment according to the present invention.
Figure 7B:
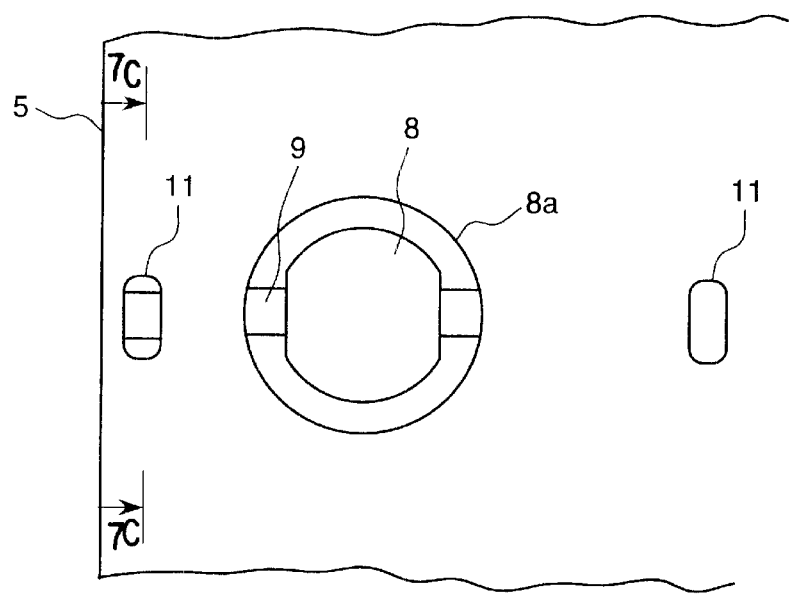
FIG. 7B is a view seen along an arrow Y in FIG. 1 and is a detailed structure of and around a guide use roller for a handle in the second embodiment according to the present invention.
Figure 7C:
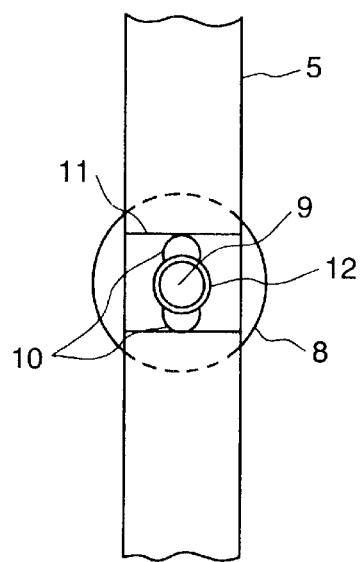
FIG. 7C is a cross sectional view taken along arrowed lines b—b in FIG. 7B.

Now, a detailed structure of and near the guide use roller for the handle 5 in the second embodiment according to the present invention will be explained with, reference to FIGS. 7A through 7D. FIG. 7A is a view seen along an arrow X in FIG. 1, FIG. 7B is a view seen along an arrow Y in FIG. 1, FIG. 7C is a cross sectional view taken along lines b—b in FIG. 7B and FIG. 7D is a cross sectional view taken along lines c—c in FIG. 7A.

The present embodiment adds two elliptical holes 11 to the handle 5 of the control rod 1 according to the first embodiment. As shown in FIG. 7B, the elliptical holes 11 are provided at both end portions of the pin 9. Namely, one of the elliptical holes 11 is provided at the top end portion of the pin 9 (at the right end portion in FIG. 7B) and is communicated with the grooves 10 and the pin hole 12. The other elliptical hole 11 is provided adjacent the welded portion (at left end portion in FIG. 7B) 15 of the pin 9 and is also communicated with the grooves 10 and the pin hole 12.

Figure 7D:
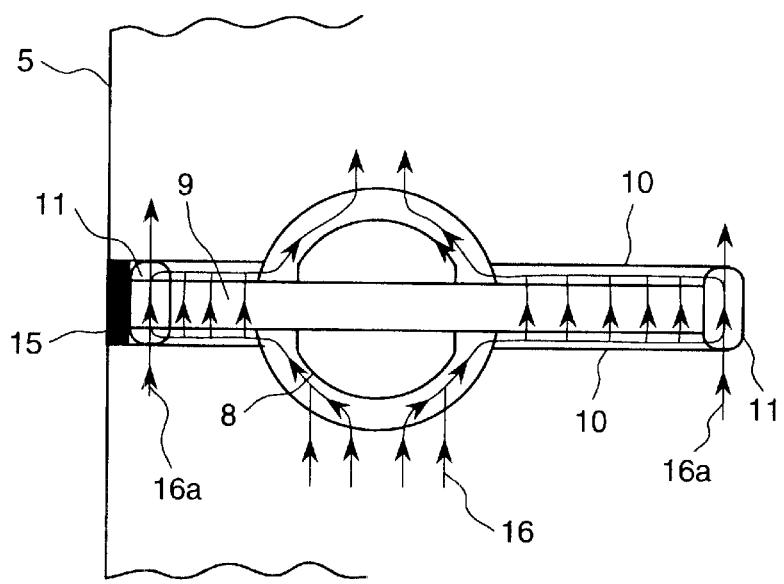
FIG. 7D is a cross sectional view taken along arrowed lines c—c in FIG. 7A.

In the present embodiment too, the water flow 16 as shown by arrows in FIG. 7D can be positively induced, therefore, the same advantage as in the first embodiment can be obtained. Namely, even if a stay interval of the control rod 1 in the nuclear reactor is prolonged, the corrosive environment at the clearance portion around the pin 9 can be surely improved while maintaining the sliding function of the control rod by the guide use roller. Thereby, the soundness of the control rod is enhanced as well as the reliability thereof is also enhanced.

In the present embodiment, since the elliptical holes 11 communicate with the grooves 10 and the pin hole 12, the water flow 16 can be effected more easily than in the first embodiment, which further enhances the advantage. Namely, the elliptical holes 11 possesses a function of promoting water flow in the grooves 10 and the pin hole 12. Further, as shown in FIG. 7D, other than the water flow 16 coming from the circular hole 8a another water flow 16a directly flowing in through the elliptical holes 11 exists. The water flow 16a through the elliptical holes 11 further promotes the water flow 16. By this action, the corrosive environment at the clearance portion around the pin 9 can be further improved.

Further, in the first embodiment, since pin hole 12 is closed at the both ends of the pin 9, if a corrosion is induced due to failure of the pump circulating the reactor water, the stress 14 as explained in connection with FIG. 6 increases at the both end portions of the pin 9. However, in the present embodiment, since the elliptical holes 11 are provided at the both end portions of the pin 9, there are no portion 5a to which the stress 14 acts at the both end portions of the pin 9. Accordingly, even if a corrosion is caused at the clearance between the pin 9 and the pin hole 12 due to a failure of the pump, the stress 14 acting at portions near the clearance can be reduced, which also contributes to suppress a possible generation of stress corrosion cracking.

Figure 8A:
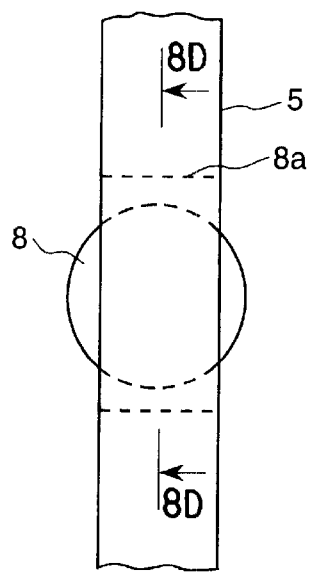
FIG. 8A is a view seen along an arrow in FIG. 1 and is a detailed structure of and around a guide use roller for a handle in the third embodiment according to the present invention.
Figure 8B:
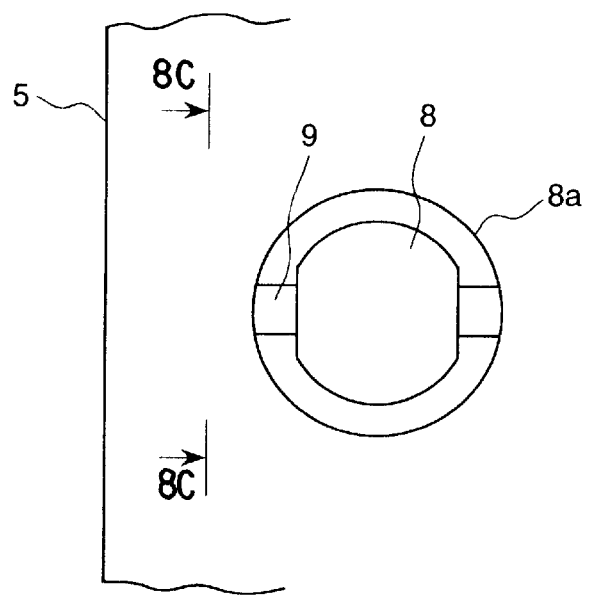
FIG. 8B is a view seen along an arrow Y in FIG. 1 and is a detailed structure of and around a guide use roller for a handle in the third embodiment according to the present invention.
Figure 8C:
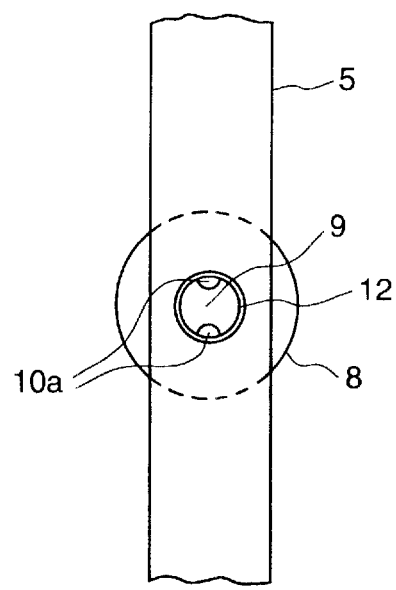
FIG. 8C is a cross sectional view taken along arrowed lines b—b in FIG. 8B.
Figure 8D:
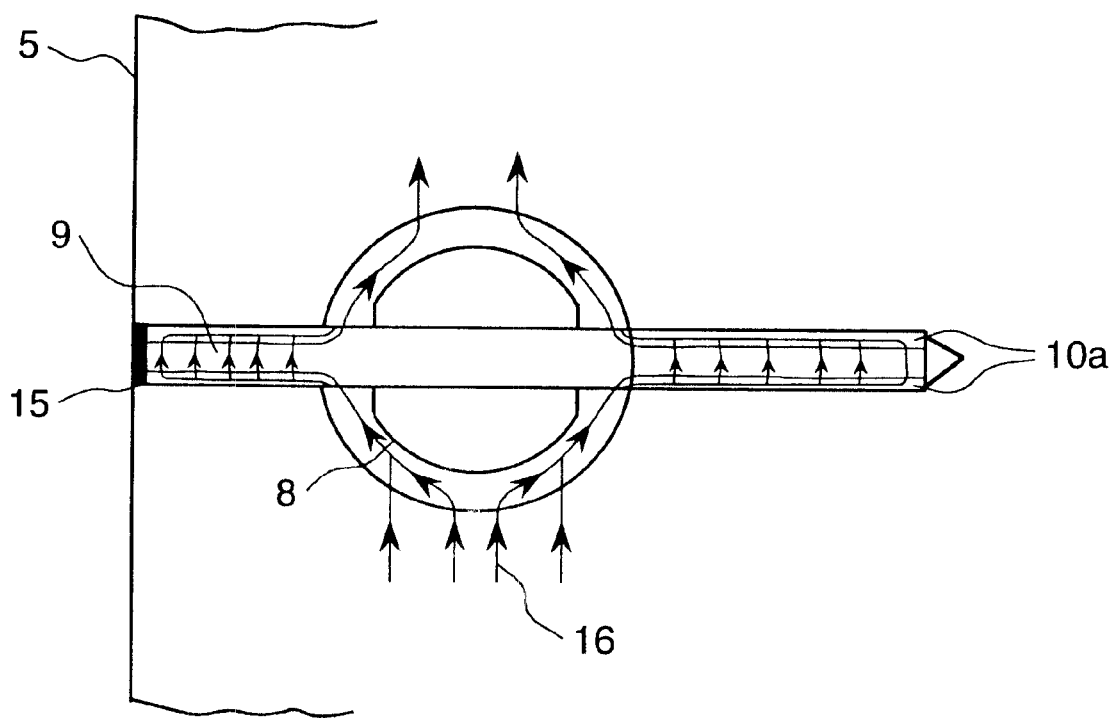
FIG. 8D is a cross sectional view taken along arrowed lines c—c in FIG. 8A.

Now, a detailed structure of and near the guide use roller for the handle 5 in the third embodiment according to the present invention will be explained with reference to FIGS. 8A through 8D. FIG. 8A is a view seen along an arrow X in FIG. 1, FIG. 8B is a view seen along an arrow Y in FIG. 1, FIG. 8C is a cross sectional view taken along lines b—b in FIG. 8B and FIG. 8D is a cross sectional view taken along lines c—c in FIG. 8A. In the present embodiment, grooves 10a are provided at the pin 9 instead of providing the grooves 10 at the handle 5 in the first embodiment. As shown in FIG. 8C, the grooves 10a are provided at the upper end portion and at the lower end portion of the pin 9. Namely, the two grooves 10a are disposed at the upstream side and at the downstream side in the axial direction of the control rod 1 as well as adjacent to the clearance between the pin 9 and the pin hole 12. As shown in FIG. 8D, the grooves 10a are formed from the circular hole 8a near to the portions of the pin 9.

In the present embodiment too, the water flow 16 as shown by arrows in FIG. 8D can be positively induced, therefore, the same advantage as in the first embodiment can be obtained. Namely, even if a stay interval of the control rod 1 in the nuclear reactor is prolonged, the corrosive environment at the clearance portion around the pin 9 can be surely improved. Thereby, the soundness of the control rod is enhanced as well as the reliability thereof is also enhanced. Further, in the present embodiment, through the provision of the grooves 10a on the pin 9, the processing of the grooves 10a is facilitated in comparison with the first embodiment, thereby, the processing time of the control rod as well as the processing cost thereof are further reduced.

Figure 9:
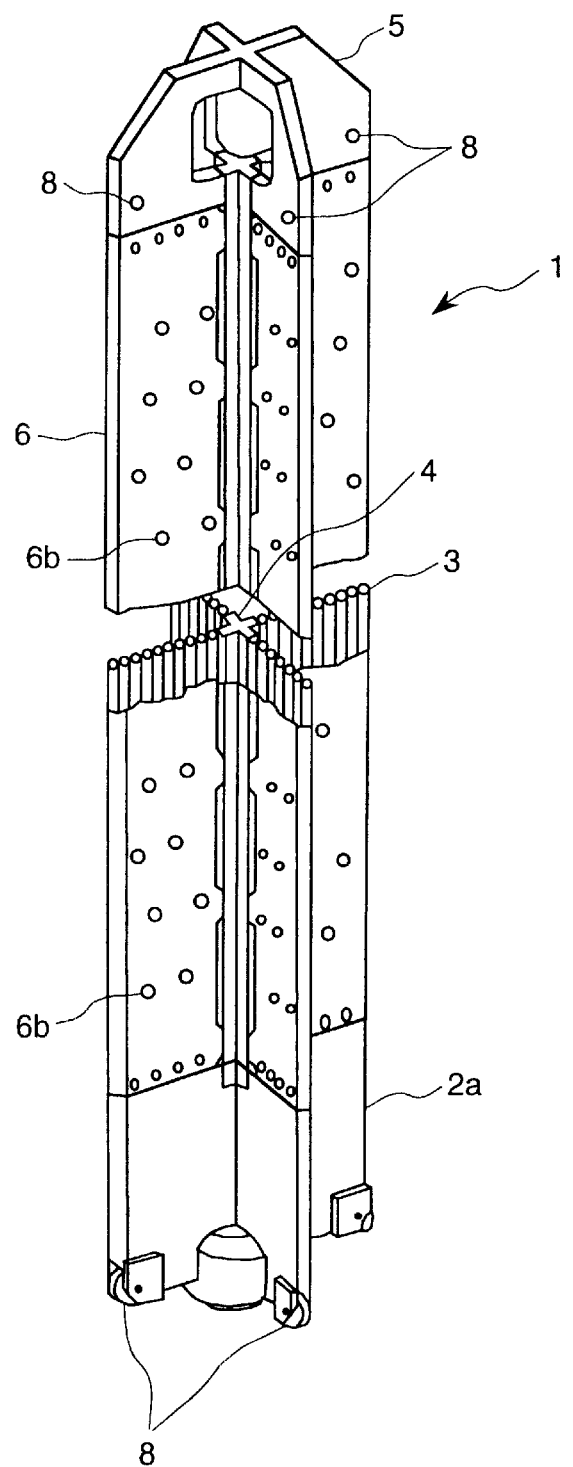
FIG. 9 is a schematic structural diagram showing another example of a boiling water type nuclear reactor use control rod in which a lower portion supporting plate is provided in place of the dropping speed limiter in FIG. 1.

Further, in the above embodiments, examples have been explained in which the grooves are provided around the pin in a guide use roller for the handle 5, however, when a like groove is provided around a pin in a guide use roller for a dropping speed limiter 2, the same advantages as explained above will be obtained. Further, as in the example shown in FIG. 9 when a like groove is provided around a pin in a guide use roller for a lower portion supporting plate 2a, the same advantages as explained above will be obtained.

According to the present invention, even if the stay interval of the control rod in the nuclear reactor is prolonged, a corrosive environment at the clearance portion in the guide use, roller can be surely improved while maintaining the sliding function of the control rod by the guide use roller.

What is claimed is:

1. A boiling water type nuclear reactor use control rod which comprises a tie rod having substantially cross shaped cross section, a plurality of sheathes having substantially U shape cross section and attached to the respective sides of the tie rod, a plurality of neutron absorption rods disposed inside the respective sheathes, a handle which is disposed at one ends of the sheathes in the axial direction of the control rod and a lower portion supporting plate or a dropping speed limiter which is disposed at the other ends of the sheathes in the axial direction of the control rod, wherein at least one of the handle, the lower portion supporting plate and the dropping speed limiter is provided with a sliding structural body which is constituted by a pin, a pin hole into which the pin is inserted and a roller which rotates around the pin in the axial direction, and at least one groove is sized to promote water flow in a clearance between the pin and the pin hole and is arranged adjacent the clearance.

2. A boiling water type nuclear reactor use control rod according to claim 1, wherein the at least one groove is provided either at the outside or at the inside of the clearance.

3. A boiling water type nuclear reactor use control rod according to claim 2, wherein the at least one groove is provided at an upstream axial side and at a downstream axial side.

4. A boiling water type nuclear reactor use control rod according to claim 3, wherein the at least one groove is formed so as to extend near to end portions of the pin.

5. A boiling water type nuclear reactor use control rod according to claim 4, wherein the handle is provided with an opening near the end portions of the pin.

6. A boiling water type nuclear reactor use control rod which comprises a tie rod having a substantially cross shaped in its cross section, a plurality of sheathes having substantially U shape in its cross section each being attached to the respective four sides of the tie rod, a plurality of neutron absorption rods disposed inside the respective sheathes, a handle disposed at the upper ends of the sheathes and a lower supporting plate or a dropping speed limiter disposed at the lower ends of the sheathes, wherein each of four wings which constitute the handle is provided with a guide use roller constituted by a pin, a pin hole into which the pin is inserted and a roller which rotates in the axial direction around the pin, and a groove is sized to promote water flow in a clearance between the pin and the pin hole and is arranged at two positions adjacent the clearance.

7. A boiling water type nuclear reactor use control rod according to claim 6, wherein at least one of the lower portion supporting plate and the dropping speed limiter is provided with a second guide use roller constituted by a pin, a pin hole into which the pin is insertably arranged and a roller which rotates in the axial direction around the pin, and a groove which promotes water flow in a clearance between the pin and the pin hole is provided at two positions adjacent to the clearance of the second guide use roller.

8. A boiling water type nuclear reactor use control rod which comprises a tie rod having a substantially cross shaped in its cross section, a plurality of sheathes having substantially U shape in its cross section each being attached to the respective four sides of the tie rod, a plurality of neutron absorption rods disposed inside the respective sheathes, a handle disposed at the upper ends of the sheathes and a guide use roller which is provided at the handle and permits sliding of the control rod in an axial direction thereof, wherein a groove is sized to promote water flow in a clearance between the pin and the pin hole in the guide use roller and is provided adjacent the clearance at an upstream axial side and at a downstream axial side so as to communicate with the clearance.

* * * * *